(12) United States Patent
Zhang

(10) Patent No.: US 11,468,598 B2
(45) Date of Patent: Oct. 11, 2022

(54) SYSTEM AND METHOD FOR CAMERA CALIBRATION

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/080,866

(22) Filed: Oct. 27, 2020

(65) Prior Publication Data

US 2021/0042962 A1 Feb. 11, 2021

Related U.S. Application Data

(63) Continuation of application No. PCT/CN2019/084418, filed on Apr. 26, 2019.

(Continued)

(51) Int. Cl.
*G06T 7/80* (2017.01)
*G06V 10/46* (2022.01)

(52) U.S. Cl.
CPC .............. *G06T 7/80* (2017.01); *G06V 10/46* (2022.01); *G06V 10/473* (2022.01)

(58) Field of Classification Search
CPC ... G06T 7/80; G06T 2207/30232; G06K 9/48; G06K 2009/485
See application file for complete search history.

(56) References Cited

U.S. PATENT DOCUMENTS

| 5,748,199 A | * | 5/1998 | Palm | ............... | H04N 13/194 |
| | | | | | 348/E13.058 |
| 6,459,481 B1 | * | 10/2002 | Schaack | ............... | G01S 5/16 |
| | | | | | 356/241.1 |

(Continued)

FOREIGN PATENT DOCUMENTS

| CN | 101118648 A | 2/2008 |
| CN | 104036522 A | 9/2014 |

(Continued)

OTHER PUBLICATIONS

International Search Report in PCT/CN2019/084418 dated Jul. 19, 2019, 3 pages.

(Continued)

*Primary Examiner* — Philip P. Dang
(74) *Attorney, Agent, or Firm* — Metis IP LLC

(57) ABSTRACT

A method may include obtaining real-time image data relating to at least one scene acquired by a camera and identifying a plurality of real-time first features relating to a plurality of subjects from the real-time image data. The method may include determining one or more first estimated values corresponding to the plurality of real-time first features, the first estimated values being represented by a first coordinate system. The method may further include obtaining one or more first reference values corresponding to the plurality of real-time first features, the first reference values being represented by a second coordinate system, each of the first estimated values corresponding to one of the first reference values. The method may further include determining one or more real-time target parameters of the camera based on the first estimated values and the first reference values.

14 Claims, 7 Drawing Sheets

Related U.S. Application Data

(60) Provisional application No. 62/664,066, filed on Apr. 27, 2018.

(56) References Cited

U.S. PATENT DOCUMENTS

| | | | | |
|---|---|---|---|---|
| 6,819,318 | B1* | 11/2004 | Geng | G06T 17/00 382/154 |
| 6,919,892 | B1* | 7/2005 | Cheiky | G06T 13/40 348/E5.022 |
| 7,809,194 | B2* | 10/2010 | Zhang | G06T 7/80 382/181 |
| 8,026,945 | B2* | 9/2011 | Garoutte | H04N 5/23232 348/208.1 |
| 8,072,654 | B2* | 12/2011 | Lefevere | H04N 1/00063 358/488 |
| 8,197,070 | B2* | 6/2012 | Tan | G03B 21/26 353/31 |
| 8,208,029 | B2* | 6/2012 | Kim | G06T 7/85 348/176 |
| 8,462,227 | B2* | 6/2013 | Safaee-Rad | H04N 9/735 348/370 |
| 8,553,037 | B2* | 10/2013 | Smith | G06T 13/40 345/473 |
| 8,868,333 | B2 | 10/2014 | Bartels | |
| 9,036,030 | B2* | 5/2015 | Stauder | H04N 17/002 358/1.9 |
| 9,135,705 | B2* | 9/2015 | Chao | G06T 7/73 |
| 9,142,034 | B2* | 9/2015 | Hoof | A63F 13/428 |
| 9,159,140 | B2* | 10/2015 | Hoof | G06F 3/017 |
| 9,202,277 | B2* | 12/2015 | Liu | G06T 7/80 |
| 9,307,231 | B2* | 4/2016 | Mallet | G01B 21/042 |
| 9,883,163 | B2* | 1/2018 | Carr | G06T 7/85 |
| 10,302,452 | B1* | 5/2019 | Wilcox | G01C 21/005 |
| 10,366,263 | B2* | 7/2019 | Bataller | G06K 7/1443 |
| 10,372,970 | B2* | 8/2019 | Wang | G06T 7/246 |
| 10,445,898 | B2* | 10/2019 | Liu | G06T 7/80 |
| 10,878,237 | B2* | 12/2020 | Rougeaux | G06V 40/19 |
| 11,017,558 | B2* | 5/2021 | Noble | G06T 7/70 |
| 2008/0150786 | A1 | 6/2008 | Breed | |
| 2010/0067072 | A1 | 3/2010 | Lefevere | |
| 2014/0267611 | A1* | 9/2014 | Kennett | G06V 40/20 348/46 |
| 2015/0062309 | A1 | 3/2015 | Mein et al. | |
| 2016/0039096 | A1* | 2/2016 | Wallack | G06T 7/80 901/9 |
| 2018/0075593 | A1 | 3/2018 | Wang et al. | |

FOREIGN PATENT DOCUMENTS

| | | |
|---|---|---|
| CN | 106251334 A | 12/2016 |
| CN | 107239748 A | 10/2017 |
| JP | 2010287074 A | 12/2010 |
| JP | 2015106287 A | 6/2015 |
| WO | 2018014730 A1 | 1/2018 |

OTHER PUBLICATIONS

Written Opinion in PCT/CN2019/084418 dated Jul. 19, 2019, 3 pages.

* cited by examiner

100

500

600

SYSTEM AND METHOD FOR CAMERA CALIBRATION

CROSS-REFERENCE TO RELATED APPLICATIONS

This application is a continuation of International Application No. PCT/CN2019/084418 filed on Apr. 26, 2019, which claims priority of U.S. Provisional Application No. 62/664,066, filed on Apr. 27, 2018, the contents of each of which are hereby incorporated by reference.

TECHNICAL FIELD

The present disclosure generally relates to surveillance systems, and more specifically relates to methods and systems for calibrating a camera used in a surveillance system.

BACKGROUND

Video surveillance systems are widely used in a variety of applications to detect and monitor objects within an environment. In automatic driving assistance applications, such systems are employed to provide back-up assistance for safety driving. For example, the systems take images of the driver to determine the driver's drowsiness or attentiveness, provide images of the roads that the vehicle is traveling through, provide structure recognition, such as road signs, etc. To provide accurate information about the environment, it is desired to calibrate the cameras used in the video surveillance systems. However, conventional calibration techniques are typically time consuming and need to be performed at a service location. It is desirable to provide systems and methods for calibrating a camera more efficiently.

SUMMARY

According to an aspect of the present disclosure, a system may include a computer-readable storage medium storing executable instructions for calibrating a camera and at least one processor in communication with the computer-readable storage medium. When executing the set of instructions, the at least one processor may cause the system to obtain real-time image data relating to at least one scene acquired by a camera at a present moment. The at least one processor may also cause the system to identify a plurality of real-time first features relating to a plurality of subjects from the real-time image data. The at least one processor may also cause the system to determine one or more first estimated values corresponding to the plurality of real-time first features. The one or more first estimated values may be represented by a first coordinate system. The at least one processor may also cause the system to obtain one or more first reference values corresponding to the plurality of real-time first features. The one or more first reference values may be represented by a second coordinate system. Each of the one or more first estimated values may correspond to one of the one or more first reference values. The at least one processor may further cause the system to determine one or more real-time target parameters of the camera at the present moment based on the one or more first estimated values and the one or more first reference values.

In some embodiments, the at least one processor may cause the system to determine whether the camera needs to be calibrated at the present moment. The at least one processor may also cause the system to determine the one or more real-time target parameters of the camera based on the one or more first estimated values and the one or more first reference values in response to the determination that the camera needs to be calibrated.

In some embodiments, the at least one processor may cause the system to obtain one or more pre-determined parameters of the camera. The at least one processor may also cause the system to determine one or more second reference values corresponding to the plurality of real-time first features of the plurality of subjects based on the pre-determined parameters of the camera. The one or more second reference values may be represented by the second coordinate system. The at least one processor may also cause the system to determine whether the camera needs to be calibrated based on a difference between at least one of the one or more first reference values and a corresponding second reference value.

In some embodiments, the at least one processor may cause the system to determine whether a time interval between a present moment and a prior calibration nearest to the present moment exceeds a threshold. The at least one processor may also cause the system to determine whether a position of the camera at the present moment is consistent with a position of the camera when the prior calibration was performed.

In some embodiments, the at least one processor may cause the system to determine that the camera needs to be calibrated in response to a determination that the time interval between the present moment and the prior calibration nearest to the present moment exceeds the threshold; or the position of the camera at the present moment is inconsistent with the position of the camera when the prior calibration was performed.

In some embodiments, the at least one processor may cause the system to determine at least one set of real-time second features from the one or more real-time first features. The at least one processor may also cause the system to determine at least one set of one or more first parameters of the camera based on the at least one set of the real-time second features. The at least one processor may also cause the system to determine one or more second reference values corresponding to the plurality of real-time first features of the plurality of subjects based on each of the at least one set of the one or more first parameters. The at least one processor may also cause the system to determine the one or more real-time target parameters of the camera based on differences between the one or more first reference values and the one or more second reference values.

In some embodiments, the at least one processor may cause the system to obtain one or more pre-determined parameters of the camera. The at least one processor may also cause the system to determine the one or more real-time target parameters of the camera based on the one or more first estimated values, the one or more first reference values, and the one or more pre-determined parameters of the camera according to a gradient algorithm.

In some embodiments, the at least one processor may cause the system to determine the one or more real-time target parameters of the camera based on the one or more first estimated values and the one or more first reference values according to a recurrence algorithm or a numerical algorithm.

In some embodiments, the plurality of subjects may include at least one of at least one portion of a lane mark, at least one portion of a vehicle, at least one portion of a facility, and at least one portion of a human.

In some embodiments, the camera may be installed in a mobile device.

In some embodiments, the at least one processor may cause the system to detect the plurality of subjects from the real-time image data. The at least one processor may also cause the system to classify the plurality of subjects. The at least one processor may also cause the system to identify the plurality of features relating to the plurality of subjects based on the plurality of classified subjects.

According to another aspect of the present disclosure, a computer-implemented method may include one or more of the following operations performed by at least one processor. The method may include obtaining real-time image data relating to at least one scene acquired by a camera. The method may also include identifying a plurality of real-time first features relating to a plurality of subjects from the real-time image data. The method may also include determining one or more first estimated values corresponding to the plurality of real-time first features. The one or more first estimated values may be represented by a first coordinate system. The method may also include obtaining one or more first reference values corresponding to the plurality of real-time first features. The one or more first reference values may be represented by a second coordinate system. Each of the one or more first estimated values may correspond to one of the one or more first reference values. The method may further include determining one or more real-time target parameters of the camera based on the one or more first estimated values and the one or more first reference values.

According to yet another aspect of the present disclosure, a non-transitory computer-readable storage medium storing instructions that, when executed by at least one processor of a system, cause the system to perform a method. The method may include obtaining real-time image data relating to at least one scene acquired by a camera. The method may also include identifying a plurality of real-time first features relating to a plurality of subjects from the real-time image data. The method may also include determining one or more first estimated values corresponding to the plurality of real-time first features. The one or more first estimated values may be represented by a first coordinate system. The method may also include obtaining one or more first reference values corresponding to the plurality of real-time first features. The one or more first reference values may be represented by a second coordinate system. Each of the one or more first estimated values may correspond to one of the one or more first reference values. The method may further include determining one or more real-time target parameters of the camera based on the one or more first estimated values and the one or more first reference values.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 6:
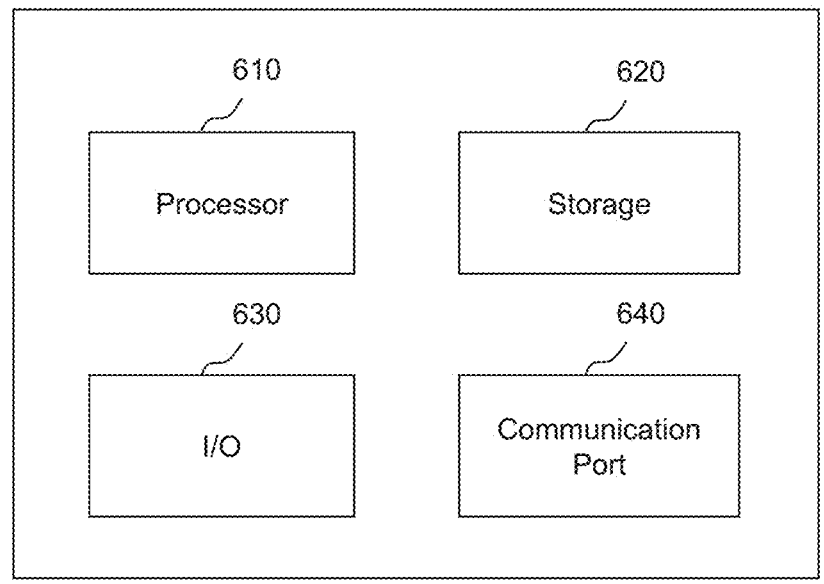
FIG. 6 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 610 as illustrated in FIG. 6) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a system and method for camera calibration. The system may obtain real-time image data relating to at least one scene acquired by a camera and identify a plurality of real-time first features relating to a plurality of subjects from the real-time image data. The system may also determine one or more first estimated values corresponding to the plurality of real-time first features. The one or more first estimated values may be represented by a first coordinate system. The system may also obtain one or more first reference values corresponding to the plurality of real-time first features. The one or more first reference values may be represented by a second coordinate system. Each of the one or more first estimated values corresponding to one of the one or more first reference values. The system may further determine one or more real-time target parameters of the camera based on the one or more first estimated values and the one or more first reference values.

Figure 1:
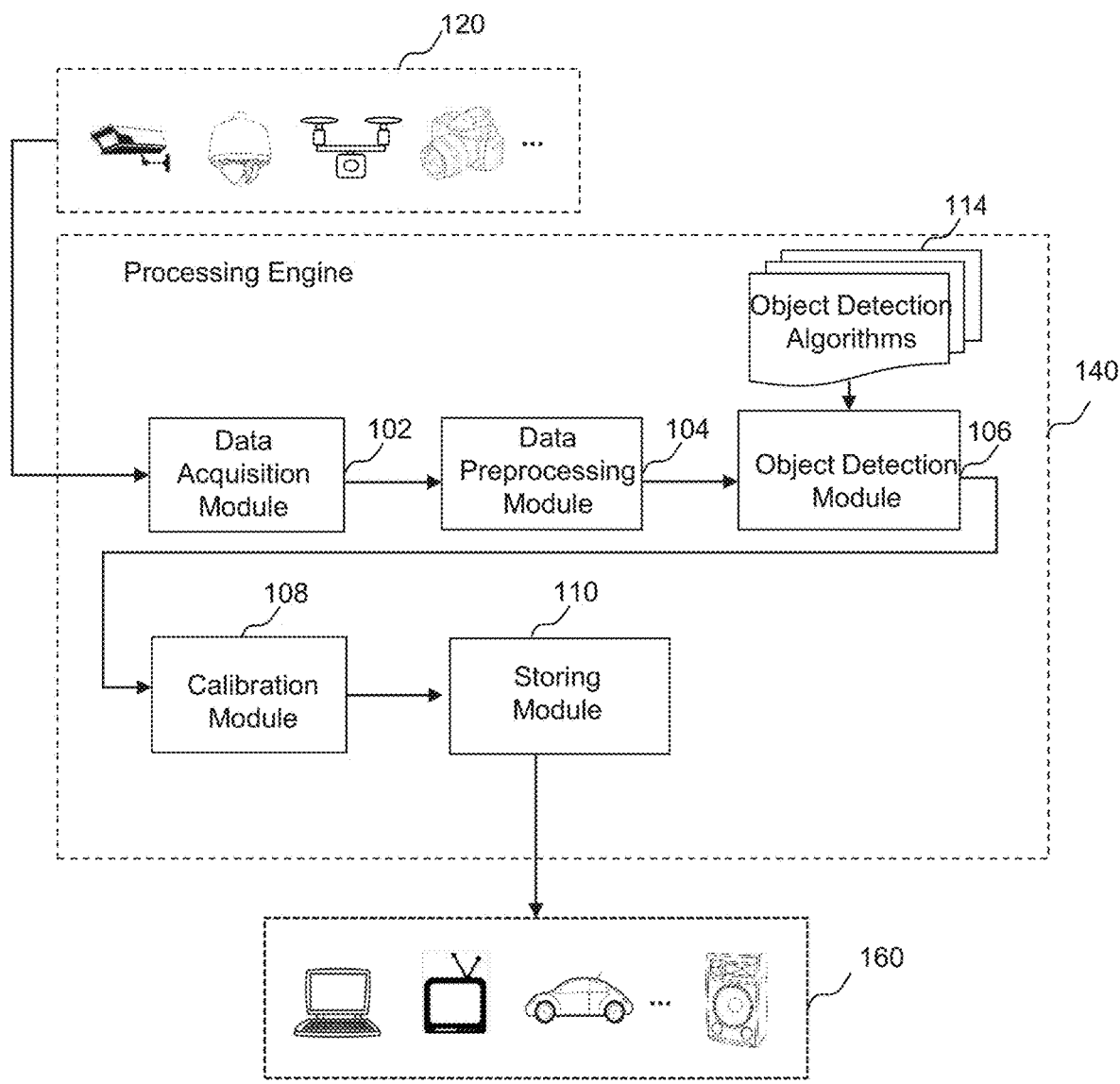
FIG. 1 is a schematic diagram illustrating an exemplary processing engine for calibrating a camera according to some embodiments of the present disclosure.
Figure 7:
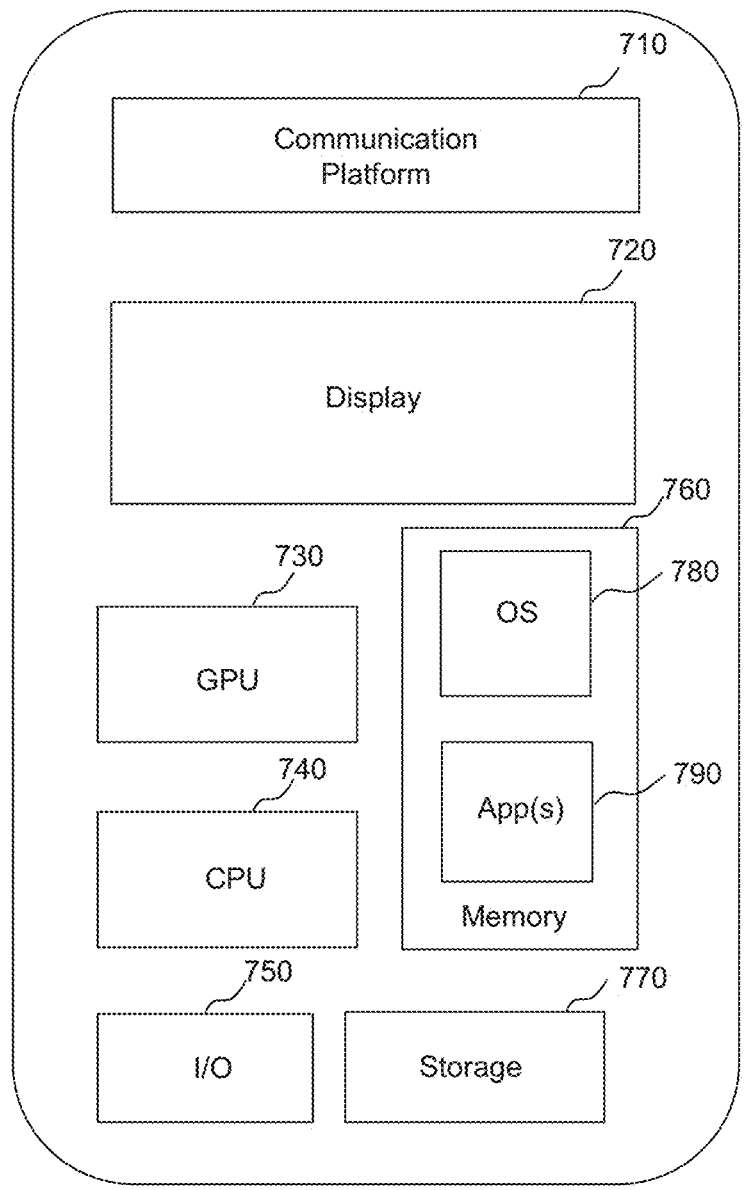
FIG. 7 is a schematic diagram illustrating exemplary hardware and/or software components of an exemplary mobile device on which the terminal(s) may be implemented according to some embodiments of the present disclosure.

FIG. 1 is a schematic diagram illustrating an exemplary processing engine 140 for calibrating a camera according to some embodiments of the present disclosure. As shown, the processing engine 140 may include a data acquisition module 102, a data preprocessing module 104, an object detection module 106, a calibration module 108, and a storing module 110. In some embodiments, the data acquisition module 102, the data preprocessing module 104, the object detection module 106, the calibration module 108, and the storing module 110 may be connected to and/or communicate with each other via a wireless connection (e.g., a network), a wired connection, or a combination thereof. At least a portion of the processing engine 140 may be implemented on a computing device as illustrated in FIG. 6 or a mobile device as illustrated in FIG. 7. The processing engine 140 may obtain real-time image data in response to that a camera installed in the computing device as illustrated in FIG. 6 or the mobile device as illustrated in FIG. 7 captures the real-time image data at a present moment. The processing engine 140 may calibrate the camera based on the captured real-time image data automatically. In some embodiments, the processing engine 140 may calibrate the camera continuously based on the captured real-time image data once the camera captures the real-time image data. In some embodiments, the processing engine 140 may calibrate the camera periodically, for example, one or more days, one or more weeks, one or more months, etc. In some embodiments, the processing engine 140 may calibrate the camera according to a physical state (e.g., a position) of the camera.

The data acquisition module 102 may acquire real-time image data relating to at least one scene acquired by a camera at a present moment. The scene acquired by the camera may include a still image scene, a video scene, or the like, or a combination thereof. In some embodiments, the real-time image data relating to a still image scene may include a still image. As used herein, the term "still image" may refer to a single static picture represented in analog and/or digital form. In some embodiments, the real-time image data relating to a video scene may include a video. As used herein, the term "video" may refer to motion pictures represented in analog and/or digital form. For examples, a video may include television, movies, image sequences from a camera or other observer, computer-generated image sequences, or the like, or a combination thereof. As used herein, a sequence may refer to a particular image or other discrete unit within a video.

The camera may be and/or include any suitable device that is capable of capturing real-time image data. For example, the data acquisition module 102 may obtain the real-time image data relating to a scene from the monitoring device 120. In some embodiments, the monitoring device 120 may include a video camera. As used herein, a video camera may refer to an apparatus for visual recording. For example, the video camera may include a color camera, a digital video camera, a camera, a camcorder, a PC camera, a webcam, an infrared (IR) video camera, a low-light video camera, a thermal video camera, a CCTV camera, a pan-tilt-zoom (PTZ) camera, a video sensing device, or the like, or a combination thereof.

The monitoring device 120 may be positioned to perform surveillance of an area of interest (AOI). The AOI may be reflected in the still image or the video as the still image scene or the video scene. In some embodiments, the scene may include one or more objects of interest. The one or more objects of interest may include a person, a vehicle, an animal, a physical subject, or the like, or a combination thereof. In some embodiment, physical properties of an object of interest may be determined to perform surveillance of the object of interest. Exemplary physical properties of an object of interest may include a type of the object of interest, a moving feature (e.g., moving speed, moving direction) of the object of interest, a size (e.g., height, width, and length) of the object of interest, a spatial position of the object of interest, or the like, or a combination thereof. For example, the monitoring device 120 installed in a vehicle may monitor the motion of the vehicle as well as the surroundings thereof. Further, the monitoring device 120 may take images relating to a neighboring lane so as to detect neighboring vehicles and to alert the driver of the vehicle if he desires to change the lane.

In some embodiments, the data acquisition module 102 may transfer the real-time image data to other modules of the processing engine 140 for further processing. For example, the data acquisition module 102 may transfer the real-time image data to the data preprocessing module 104 for pre-processing the data. As another example, the data acquisition module 102 may transfer the real-time image data to the object detection algorithms 114 for determining one or more objects from the scene. As still another example, the data acquisition module 102 may transfer the real-time image data to the storing module 110 for store in a local database or a remote database.

The data preprocessing module 104 may preprocess real-time image data relating to at least one scene acquired by a camera. In some embodiments, the preprocessing for the real-time image data relating to a scene may include an enhancement operation, a transform operation, a compress operation, an edge detection, a segmentation operation, a noise reduction operation, or the like, or a combination thereof. For example, the transform operation may be performed to transform the real-time image data relating to a scene in a domain (e.g., a spatial domain) to another domain (e.g., a frequency domain) for determining one or more features of an object in the scene. As another example, the enhancement operation may be performed to enhance a portion (e.g., a subject portion) of the scene. As still another example, the segmentation operation may be performed to identify or classify an object in the scene. In some embodiments, the data preprocessing module 104 may transfer the preprocessed real-time image data relating to a scene to other modules of the processing engine 140 for further processing. For example, the data preprocessing module 104 may transfer the preprocessed real-time image data relating to a scene to the object detection module 106 for determining one or more objects in the scene.

The object detection module 106 may detect one or more objects in the at least one scene. The object may be any composition of organic and/or inorganic matters that are with or without life. For example, the object may include a person, a vehicle, an animal, a physical subject, or the like, or a combination thereof. It should be noted that in this disclosure, the terms "object" and "subject" may be used interchangeably.

In some embodiments, the scene (e.g., a still image scene, a video scene) acquired by a camera may include a subject portion and a background portion. The subject portion may include one or more objects of interests. For example, if the scene relates to an indoor environment (e.g., a room), the subject portion may include one or more persons, one or more animals (e.g., a dog), etc., and the background portion may include one or more walls/windows, one or more furniture (e.g., a desk, a bed), one or more potting, etc. As another example, if the scene relates to an outdoor environment (e.g., a street, a park), the subject portion may include one or more vehicles, one or more pedestrians, etc., and the background portion may include one or more plants, one or more constructions, one or more communal facilities, rain, snow, swaying branches of a tree, etc.

In some embodiments, the object detection module 106 may identify the subject portion (e.g., one or more objects) and/or filter the background portion from the scene based on one or more object detection algorithms 114. Exemplary object detection algorithms may include an inter-frame difference algorithm, a background difference algorithm, an optical flow algorithm, or the like, or a combination thereof. For example, the background difference algorithm may include a temporal difference algorithm, an average filtering algorithm, a W4 algorithm, a Gaussian mixture model algorithm.

In some embodiments, the object detection module 106 may classify the one or more detected objects. For example, the detected objects may be classified into categories such as humans, animals, facility, vehicles (e.g., sedans, small pickup trucks, large pickup trucks, truck trailer, container truck, or SUVs), landmarks, or lane lines. In some embodiments, the object detection module 106 may classify the identified objects based on one or more features of the objects via a classifier technique. Exemplary classifier techniques may include a decision tree algorithm, a logistic regression algorithm, a naive Bayes algorithm, a neural network algorithm, or the like, or a combination thereof. In some embodiments, the features of objects may include a static feature and a dynamic feature. The static feature of objects may refer to a feature of an object unrelated to movements of the objects. For example, the static feature of the objects reflected in the scene may include shape (e.g., a contour, an area, a height, a width, a ratio of height to width), color, texture, or the like, or a combination thereof. The dynamic feature of objects reflected in the scene (e.g., a video scene) may relate to movements of objects. For example, the dynamic feature of objects may include a movement trail, a movement velocity, a movement displacement, a movement direction, a movement acceleration, or the like, or a combination thereof.

In some embodiments, the object detection module 106 may transfer data relating to the detected object to other modules of the processing engine 140 for further processing. For example, the object detection module 106 may transfer the features relating to the classified objects to the calibration module 108 for determining parameters of the camera. As another example, the object detection module 106 may transfer the features relating to the classified objects to the storing module 110 for store.

The calibration module 108 may preform camera calibration. As used herein, the camera calibration refers to determining or adjusting one or more parameters of a camera that may be used to convert the image coordinates to real world coordinates and vice versa. Exemplary parameters of a camera may include intrinsic parameters, extrinsic parameters, distortion parameters, etc. The intrinsic parameters of a camera may represent the optical, geometric, and digital characteristics of the camera. For example, an intrinsic parameter of a camera may include a camera focal length, an optical center, etc. The extrinsic parameters of a camera may represent the relative location and orientation of the camera with respect to the real world coordinate system. For example, an extrinsic parameter of a camera may include a tilt angle of the camera, a yaw angle of the camera, a height of the camera above a plane of the scene captured by the camera, etc. The distortion parameters of a camera may be caused by characteristics of optical lens of the camera and assembly errors. For example, a distortion parameter of a camera may include a radial distortion coefficient, a tangential distortion coefficient, etc.

In some embodiments, the intrinsic parameters of a camera may form an intrinsic matrix. The intrinsic matrix may be used to perform a transformation between camera coordinates denoted by a camera coordinate system and image coordinates denoted by an image coordinate system. The extrinsic parameters of a camera may form an extrinsic matrix. The extrinsic matrix may be used to perform a transformation between real world coordinates denoted by a real world coordinate system and camera coordinates denoted by a camera coordinate system. As used herein, the real world coordinate system refers to a fixed coordinate system for representing a subject in the real world other than the camera. The camera coordinate system refers to a coordinate system that uses the camera center as its origin and the optic axis as the Z-axis. The X-axis and Y-axis of the camera coordinate system may define an image plane. The image coordinate system refers to a coordinate system that describes positions of a subject in the image captured by a camera.

A camera matrix that may be used to perform a transformation between the real world coordinates denoted by a real world coordinate system and image coordinates denoted by an image coordinate system may be determined based on the extrinsic matrix and the intrinsic matrix. Merely for illustration purposes, the camera matrix may be determined based on Equation (1):

$$P = \begin{bmatrix} R \\ t \end{bmatrix} K \quad (1)$$

where P refers to a camera matrix;

$$\begin{bmatrix} R \\ t \end{bmatrix}$$

refers to an extrinsic matrix; R refers to a rotation operation; t refers to a translation operation; and K refers to an intrinsic matrix. In some embodiments, the real world coordinates of a point A in a real world coordinate system (or an image coordinate system) may be transformed to image coordinates in an image coordinate system (or a real world coordinate system) based on Equation (2):

$$w \begin{bmatrix} u \\ v \\ 1 \end{bmatrix} = \begin{bmatrix} X \\ Y \\ Z \\ 1 \end{bmatrix} P \quad (2)$$

where P refers to a camera matrix;

$$\begin{bmatrix} u \\ v \\ 1 \end{bmatrix}$$

refers to the image coordinates of the point A;

$$\begin{bmatrix} X \\ Y \\ Z \\ 1 \end{bmatrix}$$

refers to the real world coordinates of the point A; and w refers to a scale factor. According to Equation (2), the camera matrix may be determined based on one or more real-time first features relating to a subject represented in real-time image data and in real world.

In some embodiments, the calibration module 108 may determine parameters of a camera based on features relating to one or more classified objects in an image plane and in the real world. For example, the calibration module 108 may determine the parameters of the camera based on one or more estimated values corresponding to one or more features relating to the classified objects identified in the image plane and corresponding one or more reference values corresponding to the features in the real world. In some embodiments, the features relating to the objects may be representative of physical attributes of the objects as described elsewhere in the present disclosure (e.g., FIGS. 3-4 and the descriptions thereof). As used herein, the estimated values corresponding to the features may refer to the dimensions of the features represented in an image plane (i.e., pixel dimensions). In some embodiments, the estimated values may be represented by an image coordinate system assigned to one or more images captured by the camera. For example, the estimated values corresponding to the features may be determined in terms of numbers of pixels in the image coordinate system. As used herein, the reference values corresponding to the features may refer to the dimensions of the features represented in the real world (i.e., real world dimensions). In some embodiments, the reference value may be represented by a real world coordinate system. For example, the reference value may include a regulated or standard lane width, an average vehicle length, an average vehicle width, an average height of an adult person, or the like.

In some embodiments, the calibration module 108 may determine whether a camera needs to be calibrated. Then, the calibration module may calibrate the camera based on the judgment result. More descriptions for the calibration module 108 may be found in FIG. 3 and the descriptions thereof.

In some embodiments, the calibration module 108 may be connected to and/or communicate with other modules of the processing engine 140. For example, the calibration module 108 may transfer the determined parameters of the camera to the storing module 112 for storing in a local database or a remote database.

The storing module 110 may store data, instructions, and/or any other information relating to a calibration of a camera based on real-time image data captured by the camera. In some embodiments, the storing module 110 may store data obtained from the processing engine 140, the terminals 160, and/or the monitoring device 120. For example, the storing module 110 may store real-time image data relating to at least one scene acquired by the monitoring device 120. As another example, the storing module 110 may store parameters of a camera determined by the calibration module 108. As still another example, the storing module 110 may store one or more estimated values corresponding to one or more features relating to subjects detected in real-time image data. As still another example, the storing module 110 may store one or more reference values corresponding to one or more features relating to subjects. In some embodiments, the storing module 110 may store data and/or instructions that the processing engine 140 may execute or use to perform exemplary methods described in the present disclosure. For example, the storing module 110 may store instructions that the processing engine 140 may execute or use to determine parameters of a camera. In some embodiments, the storing module 110 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storing module 110 may be implemented on a cloud platform as described elsewhere in the disclosure. In some embodiments, the storing module 110 may be connected to and/or to communicate with one or more other components in the processing engine 140. One or more components in the processing engine 140 may access the data or instructions stored in the storing module 110.

The terminals 160 may include a mobile device, a tablet computer, . . . , a laptop computer, or the like, or any combination thereof. For example, the mobile device may include a mobile phone, a personal digital assistant (PDA), a gaming device, a navigation device, a point of sale (POS) device, a laptop, a tablet computer, or the like, or any combination thereof. In some embodiments, the terminals 160 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 140 via, for example, for further processing. Other types of the input device may include a cursor control device, such as a mouse, a trackball, or cursor direction keys, etc. The output device may include a display, a speaker, a printer, or the like, or any combination thereof.

In some embodiments, the terminal(s) 160 may establish a communication (e.g., wireless communication) with the processing engine 140, through an application (e.g., the application 790 in FIG. 7) installed in the terminal(s) 160. The application may be associated with the driving assistance system 500. For example, the application may be a vehicle navigation application associated with the driving assistance system 500. In some embodiments, the application installed in the terminal(s) 160 may direct the terminal(s) 160 to obtain, continuously or periodically, real-time image data from a camera of the terminal(s) 160 and automatically calibrate the camera of the terminal(s) 160.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the data preprocessing module 104 and the object detection module 106 may be integrated into one single module. As another example, the processing engine 140 may further include an object classification module. The object classification module may classify objects detected by the object detection module 106.

Figure 2:
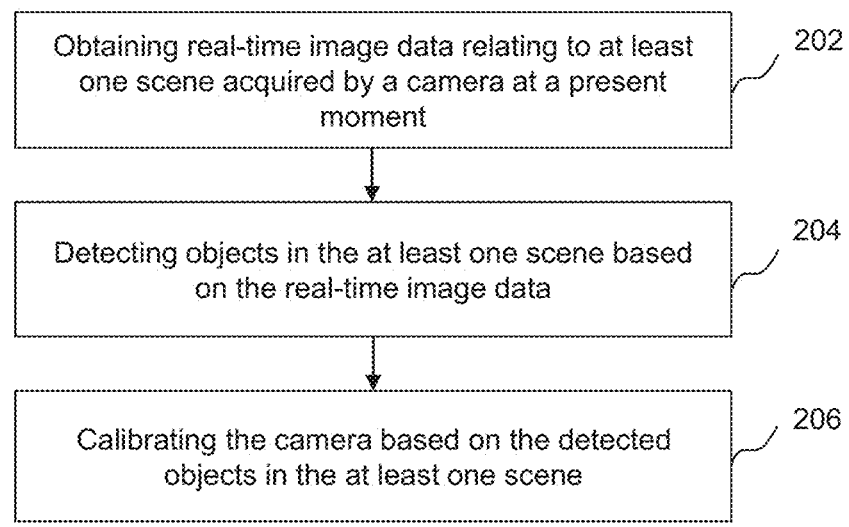
FIG. 2 is a flowchart illustrating an exemplary process for calibrating a camera according to some embodiments of the present disclosure.

FIG. 2 is a flowchart illustrating an exemplary process 200 for calibrating the camera according to some embodiments of the present disclosure. In some embodiments, one or more operations of process 200 illustrated in FIG. 2 may be implemented in the driving assistance system 500 illustrated in FIG. 5. For example, the process 200 illustrated in FIG. 2 may be stored in the storage 580 in the form of instructions, and invoked and/or executed by the processing engine 540 (e.g., the processor 610 of the computing device 600 as illustrated in FIG. 6, the GPU 730 or CPU 740 of the mobile device 700 as illustrated in FIG. 7).

In 202, real-time image data relating to at least one scene acquired by a camera may be obtained. Operation 202 may be performed by the data acquisition module 102. In some embodiments, the real-time image data relating to a scene may include a plurality of images or a video as described elsewhere in the present disclosure (e.g., FIG. 1 and the descriptions thereof). In some embodiments, the real-time image data relating to a scene acquired by the camera may be obtained from the monitoring device 120, the storage device 580, the terminals 160, or any other external storage device.

In 204, objects may be detected in the at least one scene based on the real-time image data. Operation 204 may be performed by the object detection module 106. In some embodiments, the objects may be detected in the at least one scene based on one or more object detection algorithms as described elsewhere in the present disclosure (e.g., FIG. 1 and the descriptions thereof).

In some embodiments, the detected objects may be classified by the object detection module 106 based on features (e.g., the static features, the dynamic features) of the objects via a classifier technique. Exemplary classifier techniques may include a decision tree algorithm, a logistic regression algorithm, a naive Bayes algorithm, a neural network algorithm, or the like, or a combination thereof.

In 206, a camera may be calibrated based on the detected objects in the at least one scene. Operation 206 may be performed by the calibration module 108. In some embodiments, the camera may be or part of the monitoring device 120. In some embodiments, the calibration module 108 may calibrate the camera by determining the parameters (e.g., intrinsic parameters, extrinsic parameters, or distortion parameters) of the camera. In some embodiments, the calibration module 108 may determine parameters of a camera based on features relating to one or more classified objects in an image plane and in the real world. For example, the calibration module 108 may determine the parameters of the camera based on one or more estimated values corresponding to one or more features relating to the classified objects identified in the image plane and one or more reference values corresponding to the one or more features in the real world via one or more parameter determination algorithms 116. In some embodiments, the features relating to the objects may be representative of physical attributes of the objects as described elsewhere in the present disclosure (e.g., FIGS. 3-4 and the descriptions thereof). More descriptions for determining the parameters of the camera may be found in FIG. 1, FIG. 3, FIG. 4, and the descriptions thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, an operation in process 200 may be divided into multiple operations. For example, operation 204 may include classifying the detected objects in a scene. As another example, operation 206 may include identifying real-time first features relating to the detected objects. In some embodiments, process 200 may further include storing data (e.g., the detected objects, the parameters of the camera, etc.) generated during operations 202-206.

Figure 3:
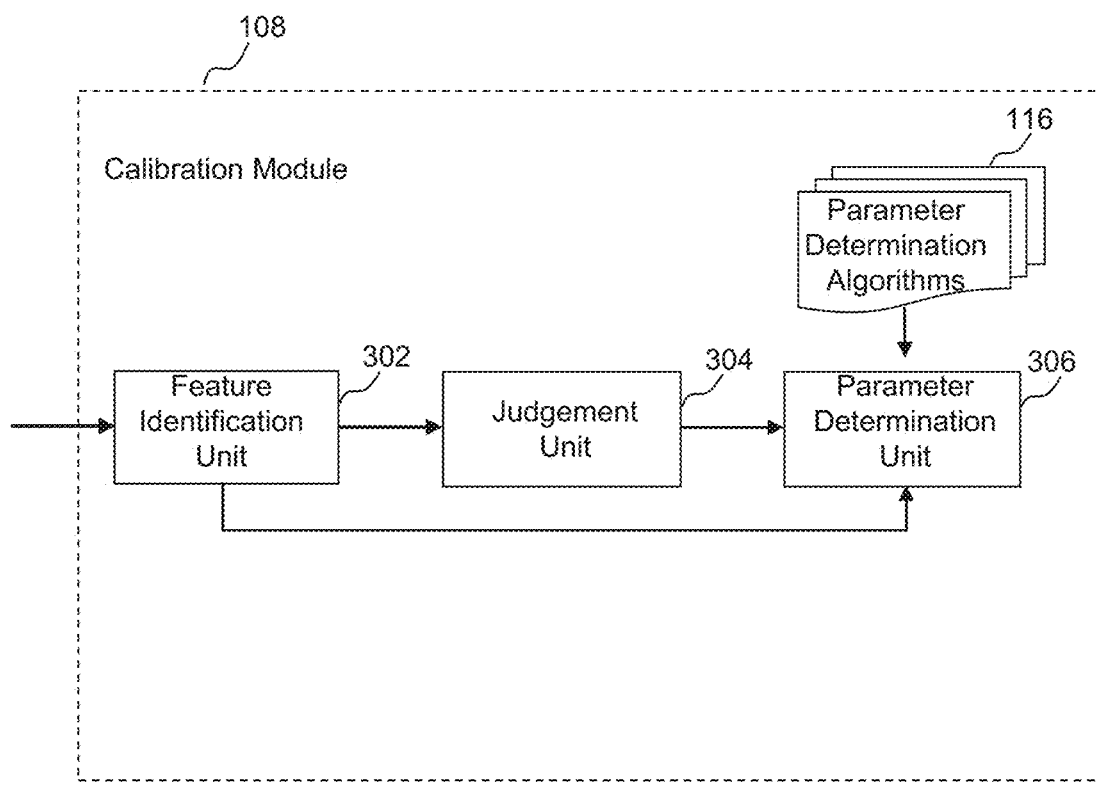
FIG. 3 is a schematic diagram illustrating an exemplary calibration module for calibrating a camera according to some embodiments of the present disclosure.

FIG. 3 is a schematic diagram illustrating an exemplary calibration module 108 for calibrating a camera according to some embodiments of the present disclosure. As shown, the calibration module 108 may include a feature identification unit 302, a judgment unit 304, and a parameter determination unit 306. In some embodiments, the feature identification unit 302, the judgment unit 304, and the parameter determination unit 306 may be connected to and/or communicate with each other via a wireless connection (e.g., a network), a wired connection, or a combination thereof.

The feature identification unit 302 may identify a plurality of real-time first features relating to one or more subjects represented in real-time image data relating to a scene. The one or more subjects represented in the real-time image data may include a person, a vehicle, an animal, a tree, a facility, or the like, or a combination thereof. For example, the person may include an adult, a child, a woman, a man, etc. The vehicle may include a sedan, a small pickup truck, a large pickup truck, a truck trailer, a container truck, an SUV, a sport coupe, a wagon, a minivan, etc. The animal may include a dog, a cat, a cattle, etc. The facility may include a lane line, a street lamp, a lane mark, a building, a road traffic sign, etc. The real-time first features relating to the subjects may be representative of physical attributes of at least one portion of each of the subjects. In some embodiments, the physical attributes of the subjects may include shape (e.g., a height, a width, a length, a ratio of height to width), color, texture, volume, area, or the like, of each of the subjects. For example, the real-time first features of a subject may include a height of a person, a skin color of the person, a texture of a jacket that the person wears, a volume of container truck, a height of a street lamp, a width of a lane line, etc. In some embodiments, the physical attributes of the subjects may include a position relationship between at least two of the subjects, at least two components of a subject, and/or a physical attribute of a component of one of the subjects. For example, a position relationship between at least two of the subjects and/or between at least two components of a subject may be defined by a distance between at least two of the subjects and/or between at least two components of a subject. Further, the real-time first features relating to the subjects may include a distance between two lane lines, a distance between two street lamps, a distance between two wheels of a vehicle, etc. As another example, a component of one of the subjects may include a license plate of a vehicle, a wheel of a vehicle, a carriage of a vehicle, etc. Further, the first feature relating to a component of one of the subjects may include a width and/or height of a license plate, a diameter and/or perimeter of a wheel, a length and/or width of a carriage, etc.

In some embodiments, the feature identification unit 302 may identify the real-time first features relating to one or more subjects according to an instruction inputted by a user via the terminals 160. For example, the user may input an instruction relating to a width of one or more subjects as the real-time first features. The feature identification unit 302 may determine the width of the subjects as the real-time first features. In some embodiments, the feature identification unit 302 may automatically identify the real-time first features. For example, the plurality of subjects may be detected and classified by the object detection module 106 based on features (e.g., static feature, dynamic feature) of the subjects according to one or more classifier technique as described elsewhere in the present disclosure (e.g., FIG. 1 and the descriptions thereof). The feature identification unit 302 may identify the real-time first features relating to the subjects based on the classification of the subjects. For example, assuming that a subject is classified as a person, the real-time first features relating to the subject may include a height of the person, a skin color of the person, a texture of a jacket that the person wears, etc. As another example, assuming that a subject is classified as a vehicle (e.g., a sedan, an SUV, a truck trailer, a container truck), the real-time first features relating to the subject may include size (e.g., a height, a width, a length) of the vehicle, size of wheels of the vehicle, size of vehicle license plate, or the like, or a combination thereof. As still another example, assuming that a subject is classified as a lane line, the real-time first features relating to the subject may include a length, a width of the lane line, and/or a distance between the lane line and adjacent lane line.

In some embodiments, the feature identification unit 302 may determine one or more estimated values corresponding to the plurality of real-time first features. As used herein, the estimated values corresponding to the real-time first features may refer to the dimensions of the real-time first features represented in an image plane (i.e., pixel dimensions) as described elsewhere in the present disclosure (e.g., FIG. 1 and the descriptions thereof). The estimated values corresponding to the real-time first features may be represented by an image coordinate system (also referred to as a first coordinate system). In some embodiments, the feature identification unit 302 may determine one or more reference values corresponding to the plurality of real-time first features. The reference values corresponding to the real-time first features may refer to the dimensions of the real-time first features represented in the real world as described elsewhere in the present disclosure (e.g., FIG. 1 and the descriptions thereof). The reference values corresponding to the real-time first features may be represented by a real world coordinate system (also referred to as a second coordinate system). In some embodiments, the reference values may indicate actual dimensions of the real-time first features in the real world. The first reference values may be obtained from the storing module 110, the storage device 580, or any external storage. In some embodiments, the reference values corresponding to the real-time first features may include second reference values. The second reference values may be determined based on estimated values corresponding to the real-time first features and pre-determined parameters of a camera. Further, the second reference values may be determined by converting the estimated values based on a pre-determined camera matrix including the pre-determined parameters of the camera. The pre-determined parameters of the camera may be obtained from the storing module 110, the storage device 580, or any external storage. For example, the pre-determined parameters of the camera may include a plurality of parameters of the camera determined last time and stored in the storing module 110, the storage device 580, any other storage described in the present disclosure or external storage.

The judgment unit 304 may determine whether a camera needs to be calibrated. The judgment unit 304 may determine whether the camera needs to be calibrated continuously or periodically. In some embodiments, the judgment unit 304 may determine whether the camera needs to be calibrated at a fixed interval, such as one day, one week, one month, etc. In some embodiments, the judgment unit 304 may determine whether the camera needs to be calibrated in real time. For example, the judgment unit 304 may determine whether the camera needs to be calibrated based on real-time image data. As a further example, the judgment unit 304 may determine whether the camera needs to be calibrated based on at least one of the first reference values corresponding to the plurality of real-time first features and at least one corresponding second reference value as described above. Further, the judgment unit 304 may compare the at least one of the first reference values with the at least one corresponding second reference value. The judgment unit 304 may determine whether the camera needs to be calibrated based on the comparison. For example, if a difference between the at least one of the first reference values and the at least one corresponding second reference value exceeds a first threshold, the judgment unit 304 may determine that the camera needs to be calibrated. As another example, whether the camera needs to be calibrated is determined based on multiple comparison results between multiple first reference values and the corresponding second reference values. If each of the multiple comparison results exceeds a second threshold, the judgment unit 304 may determine that the camera needs to be calibrated. As used herein, the first reference value and the corresponding second reference value may refer to the same first feature. In some embodiments, the judgment unit 304 may determine whether the camera needs to be calibrated based on a rule. The rule may relate to a calibration frequency associated with the camera, a specific time associated with the camera, a specific environment associated with the camera, a specific location associated with the camera, etc. For an example, the judgment unit 304 may determine whether the camera needs to be calibrated by determining whether a time interval between the present moment to a prior calibration of the camera nearest to the present moment exceeds a threshold, such as one week, one month, etc. If the judgment unit 304 determines that the time interval between the present moment to the prior calibration of the camera nearest to the present moment exceeds the threshold, the judgment unit 304 may determine that the camera needs to be calibrated. As another example, the judgment unit 304 may determine whether the camera needs to be calibrated based on the light and shade of the environment, the background scene of the environment, etc.

In some embodiments, the judgment unit 304 may determine whether a camera needs to be calibrated based on a change of real-time status of the camera. For example, the judgment unit 304 may detect a change of location and/or orientation of an in-vehicle camera with respect to the vehicle, which may be caused by road bumps, collisions, vehicle loads, or the like. Upon a determination that the judgment unit 304 detects a change of status of the camera, the judgment unit 304 may determine that the camera needs to be calibrated. Upon a determination that the judgment unit 304 does not detect a change of status of the camera, the judgment unit 304 may determine that the camera does not need to be calibrated. As a further example, the judgment unit 304 may determine whether a position of the camera at the present moment is consistent with a position of the camera when the prior calibration was performed. If the judgment unit 304 determines that the position of the camera at the present moment is inconsistent with the position of the camera when the prior calibration was performed, the judgment unit 304 may determine that the camera needs to be calibrated. More descriptions regarding the determination whether the camera needs to be calibrated based on one or more first reference values corresponding to the plurality of real-time first features and one or more corresponding second reference values may be found elsewhere in the preset disclosure (e.g., FIG. 4 and the description thereof).

The parameter determination unit 306 may determine one or more real-time target parameters of a camera. The real-time target parameters of the camera may include intrinsic parameters, extrinsic parameters, and/or distortion parameters of the camera as described elsewhere in the present disclosure (e.g., FIG. 1 and the descriptions thereof). The parameter determination unit 306 may determine the real-time target parameters of the camera based on real-time image data acquired by the camera. Further, the parameter determination unit 306 may determine the real-time target parameters of the camera based on estimated values corresponding to real-time first features relating to one or more subjects represented by an image coordinate system and first reference values corresponding to the real-time first features represented by a real world coordinate system. In some embodiments, the real-time target parameters of the camera may form a camera matrix that may be used to transform image coordinates (or real world coordinates) to real world coordinates (or image coordinates). The camera matrix may be calculated based the estimated values represented by the image coordinate system and the first reference values represented by the real world coordinate system.

In some embodiments, the parameter determination unit 306 may determine the real-time target parameters of the camera based on one or more parameter determination algorithms 116. Exemplary parameter determination algorithms 116 may include a random validation algorithm, a gradient algorithm, a recurrence algorithm, a numerical algorithm, or the like, or any combination thereof. For example, the parameter determination unit 306 may determine the parameters of the camera based on image coordinates of two end points of a line corresponding to a first feature (e.g., a width of a vehicle) and a first reference value corresponding to the first feature in the real world coordinates according to a numerical algorithm. As another example, the parameter determination unit 306 may determine the real-time target parameters of the camera based on one or more first estimated values, one or more first reference values, and one or more pre-determined parameters of the camera according to a gradient algorithm. Further, the parameter determination unit 306 may designate the pre-determined parameters of the camera as initial parameters of the camera. The parameter determination unit 306 may determine second reference values relating to the real-time first features represented by the real world coordinate system based on the initial parameters of the camera and the estimated values relating to the real-time first features represented by the imaging coordinate system. The second reference values may be compared with the first reference values. A difference between one of the second reference values and a corresponding first reference value may be determined. The parameter determination unit 306 may adjust the initial parameters of the camera toward a direction in which the difference between the second reference value and the first reference value decreases. The determination of the real-time target parameters of the camera may be an iterative process including one or more iterations. During each iteration, the parameter determination unit 306 may update the initial parameters of the camera based on the difference between a second reference value and a corresponding first reference value. The iterative process may be ended until the difference between a second reference value and a corresponding first reference value does not decrease and updated parameters of the camera may be designated as the target parameters of the camera.

In some embodiments, the parameter determination unit 306 may determine a plurality of real-time second features from the one or more real-time first features. The plurality of real-time second features may be classified into multiple experimental groups (also referred to as multiple sets of real-time second features). The parameter determination unit 306 may determine multiple groups of experimental parameters of the camera based on the multiple experimental groups of the plurality of real-time second features. Each of the multiple experimental groups of the plurality of real-time second features may correspond to one of the multiple groups of experimental parameters of the camera. Each group of the experimental parameters may be used to determine multiple groups of second reference values relating to the real-time first features represented by the real world coordinate system. Each of the multiple groups of second reference values may be compared with the first reference values, respectively. An average difference between each of the multiple groups of second reference values and the first reference values may be determined. One group of experimental parameters corresponding to a group of second reference values with a minimum average difference may be designated as the real-time target parameters of the camera.

In some embodiments, the parameter determination unit 306 may further transmit the determined parameters of a camera to a storage, for example, the storing module 110, the storage device 580, or any other external storage. The stored parameters may be used to calibrate the camera for next time.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the feature identification unit 302 and the judgment unit 304 may be integrated into one single unit. As another example, the calibration module 108 may calibrate a camera based on the real-time target parameters provided by the parameter determination unit 306 periodically or instantly without determining whether the camera needs to be calibrated.

Figure 4:
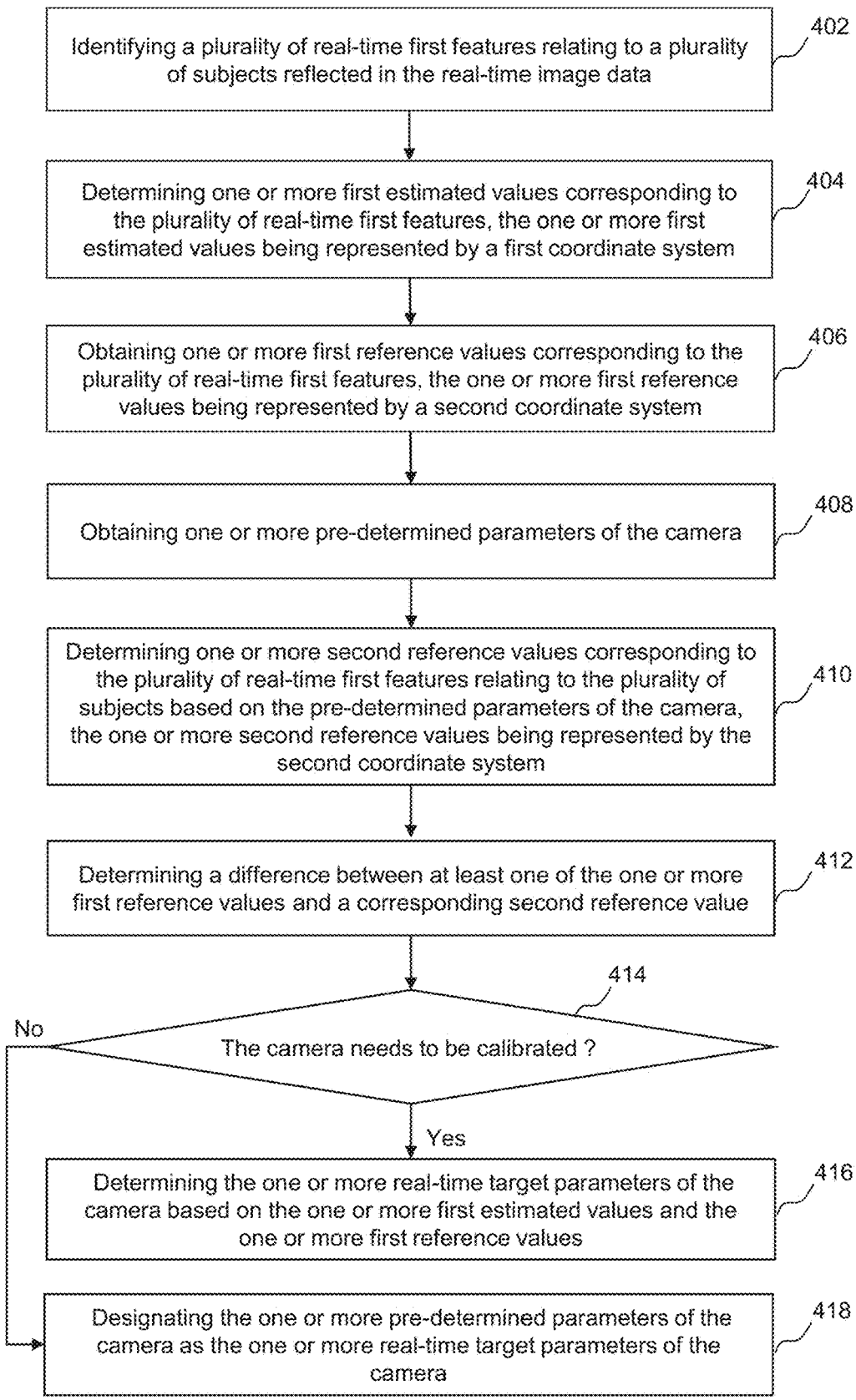
FIG. 4 is a flowchart illustrating an exemplary process for determining one or more real-time target parameters of a camera according to some embodiments of the present disclosure.

FIG. 4 is a flowchart illustrating an exemplary process 400 for determining one or more real-time target parameters of a camera according to some embodiments of the present disclosure. In some embodiments, one or more operations of process 400 illustrated in FIG. 4 may be implemented in the driving assistance system 500 illustrated in FIG. 5. For example, the process 400 illustrated in FIG. 4 may be stored in the storage device 580 in the form of instructions, and invoked and/or executed by the processing device 540 (e.g., the processor 610 of the computing device 600 as illustrated in FIG. 6, the GPU 730 or CPU 740 of the mobile device 700 as illustrated in FIG. 7).

In 402, a plurality of real-time first features relating to a plurality of subjects reflected in the real-time image data may be identified. Operation 402 may be performed by the feature identification unit 302. In some embodiments, the real-time image data may be related to at least one scene acquired by a camera as described elsewhere in the present disclosure (e.g., FIG. 1 and FIG. 2, and the descriptions thereof). For example, the real-time image data relating to a video scene may include a video. The video may include multiple image sequence. The plurality of real-time first features relating to the plurality of subject may be identified from one or more image sequences of the video.

The plurality of subjects represented in the real-time image data may include a person, a vehicle, an animal, a tree, a facility, or the like, or a combination thereof. The real-time first features relating to the subjects may be representative of physical attributes of at least one portion of each of the subjects as described elsewhere in the present disclosure (e.g., FIG. 1, FIG. 2, FIG. 3, and the descriptions thereof). In some embodiments, the feature identification unit 302 may identify the real-time first features relating to one or more subjects according to an instruction inputted by a user via the terminals 160 as described in FIG. 3 and the description thereof. In some embodiments, the plurality of real-time first features relating to the plurality of subject may be identified from the real-time image data automatically by the feature identification unit 302 as described in FIG. 3 and the description thereof. In some embodiments, the plurality of real-time first features relating to the plurality of subject may be identified manually by an operator. For example, the operator may freeze a video and obtain at least one image sequence via a user interface of a user terminal (e.g., the terminal 160). The operator may manually identify the real-time first features from the at least one image sequence displayed on the user interface. Merely by ways of example, the operator may draw a line over a person (or a vehicle) on the image sequence displayed on the user interface to identify the height of the person (or the length of the vehicle). Alternatively, the operator may mark one or more points on the image sequence displayed on the user interface to identify the real-time first features. Merely for illustration purposes, for identify the height of a person, the operator may mark a first point underneath the feet of the person and mark a second point above the head of the person. The operator may then draw a line between the first point and the second point or the feature identification unit 302 may automatically generate a line between the first point and the second point. The line may correspond to the height of the person.

In 404, one or more first estimated values corresponding to the plurality of real-time first features may be determined. Operation 404 may be performed by the feature identification unit 302. As used herein, the estimated values corresponding to the real-time first features may refer to the dimensions of the real-time first features represented in the image plane (i.e., pixel dimensions) as described elsewhere in the present disclosure (e.g., FIG. 1 and the descriptions thereof). The estimated values corresponding to the real-time first features may be represented by an image coordinate system (also referred to as a first coordinate system). The one or more first estimated values corresponding to the plurality of real-time first features may be determined in terms of numbers of pixels in the image coordinate system. For example, the first estimated value corresponding to the height of the subject may be determined as the number of pixels from the bottom of the group of pixels constituting the subject to the top of the group of pixels of the subject. As another example, the first estimated values corresponding to the height of the subject may be determined based on image coordinates of a point on the top of the subject and image coordinates of a point of the bottom of the subject.

In 406, one or more first reference values corresponding to the plurality of real-time first features may be obtained. Operation 406 may be performed by the data acquisition module 102. The reference values corresponding to the real-time first features may refer to the dimensions of the real-time first features represented in the real world as described elsewhere in the present disclosure (e.g., FIG. 1 and the descriptions thereof). The reference values corresponding to the real-time first features may be represented by a real world coordinate system (also referred to as a second coordinate system).

In some embodiments, each of the one or more first estimated values may corresponding to one of the one or more first reference values. For example, the first estimated values corresponding to the height of an adult male may be associated with an average height of an adult male (e.g., 1.75 m). As another example, the first estimated values corresponding to the width of a Honda SUV may be associated with a known width of the Honda SUV (e.g., 4.5 m).

In some embodiments, the data acquisition module 102 may obtain the one or more first reference values from one or more components of the driving assistance system 500 (e.g., the storage device 580, the storing module 110, the monitoring device 120, and/or the terminal(s) 160). In some embodiments, a user may provide the first reference values to the driving assistance system 500. The first reference values may be stored in the storage device (e.g., the storage device 580). The data acquisition module 102 may access the storage device and retrieve the first reference values. Additionally or alternatively, the data acquisition module 102 may obtain the first reference values from another source via the network 550. Another source may include a website, a database, a system, and/or any other source that may include the first reference values. For example, the data acquisition module 102 may obtain information relating to a vehicle (e.g., an average length of a sedan, an average width of wheels of a truck trailer) from an automotive supplier website.

In 408, one or more pre-determined parameters of the camera may be obtained. Operation 408 may be performed by the data acquisition module 102. The pre-determined parameters of the camera may include intrinsic parameters, extrinsic parameters, and/or distortion parameters of the camera as described elsewhere in the present disclosure (e.g., FIG. 1 and FIG. 3, and the descriptions thereof). In some embodiments, the data acquisition module 102 may obtain the one or more pre-determined parameters of the camera from one or more components of the driving assistance system 500 (e.g., the storage device 580, the storing module 110, the monitoring device 120, and/or the terminal(s) 160).

In 410, one or more second reference values corresponding to the plurality of real-time first features relating to the plurality of subjects may be determined based on the one or more pre-determined parameters of the camera. Operation 410 may be performed by the judgment unit 304. The one or more second reference values may be represented by a second coordinate system (also referred to as a real world coordinate system) as described elsewhere in the present disclosure. In some embodiments, the second reference values may be determined by converting the estimated values based on a camera matrix including the pre-determined parameters of the camera. In some embodiments, the judgment unit 304 may determine a second reference value based on one or more coordinate transformation operations. The one or more coordinate transformation operation may be associated with the pre-determined parameters of the camera. Take a determination of a specific second reference value as an example, the judgment unit 304 may determine image coordinates of two end points of a line corresponding to a first feature (e.g., a width of a vehicle). The judgment unit 304 may transform the image coordinates of the two end points to camera coordinates. The judgment unit 304 may then transform the camera coordinates to real world coordinates. The judgment unit 304 may further determine the second reference value based on the real world coordinates of the two end points.

In 412, a difference between at least one of the one or more first reference values and a corresponding second reference value may be determined. Operation 412 may be performed by the judgment unit 304. For example, the difference between a first reference value and a corresponding second reference value may be determined by subtracting the first reference value (or the second reference value) from the corresponding second reference value (or the first reference value).

In 414, a determination may be made as to whether the camera needs to be calibrated. Operation 412 may be performed by the judgment unit 304. In some embodiments, the judgment unit 304 may determine whether the camera needs to be calibrated based on the difference between at least one of the one or more first reference values and a corresponding second reference value and a threshold. For example, the judgment unit 304 may determine whether the difference between the at least one of the first reference values and the one corresponding second reference value is greater than a first threshold. Upon a determination that the difference is greater than the first threshold, the judgment unit 304 may determine that the camera needs to be calibrated. Upon a determination that the difference is not greater than the first threshold, the judgment unit 304 may determine that the camera does not need to be calibrated. As another example, the judgment unit 304 may determine whether each of differences between first reference values and corresponding second reference values is greater than a second threshold. Upon a determination that each of the differences between first reference values and corresponding second reference values is greater than the second threshold, the judgment unit 304 may determine that the camera needs to be calibrated. Upon a determination that one of the differences between first reference values and corresponding second reference values is not greater than the second threshold, the judgment unit 304 may determine that the camera does not need to be calibrated. As still another example, the judgment unit 304 may determine whether a number of differences between first reference values and corresponding second reference values exceeds a third threshold. Upon a determination that the number of differences is greater than the third threshold, the judgment unit 304 may determine that the camera needs to be calibrated. Upon a determination that the number of differences is not greater than the third threshold, the judgment unit 304 may determine that the camera does not need to be calibrated. The thresholds may be default parameters stored in a storage device (e.g., the storing module 110, the storage device 580, or the storage 620). Additionally or alternatively, the thresholds may be set manually or be determined by one or more components of the driving assistance system 500 according to different situations.

Upon a determination that the camera needs to be calibrated, the process 400 may proceed to 416 to determine one or more real-time target parameters of the camera based on the one or more first estimated values and the one or more first reference values. Upon a determination that the camera does not need to be calibrated, the process 400 may proceed to 418 to designate the one or more pre-determined parameters of the camera as the one or more real-time target parameters of the camera.

In 416, the one or more real-time target parameters of the camera may be determined based on the one or more first estimated values and the one or more first reference values. Operation 416 may be performed by the parameter determination unit 306. The parameters of the camera may include intrinsic parameters, extrinsic parameters, and distortion parameters of the camera as described elsewhere in the present disclosure (e.g., FIG. 1 and FIG. 3, and the descriptions thereof). In some embodiments, the parameters of the camera may be determined based on one or more first estimated values corresponding to the real-time first features and one or more corresponding first reference values via one or more parameter determination algorithms 116 as described in FIG. 3 and the description thereof. Exemplary parameter determination algorithms 114 may include random validation algorithm, gradient algorithm, recurrence algorithm, numerical algorithm, or the like, or a combination thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the process 400 may be accomplished with one or more additional operations not described, and/or without one or more of the operations discussed. For example, operations 408-414 may be omitted. The calibration module 108 may calibrate the camera based on the real-time target parameters provided by the parameter determination unit 306 periodically or instantly without determining whether the camera needs to be calibrated. In some embodiments, the order of the operations in process 400 may be changed. For example, operation 408 and operation 410 may be performed before operation 406.

Figure 5:
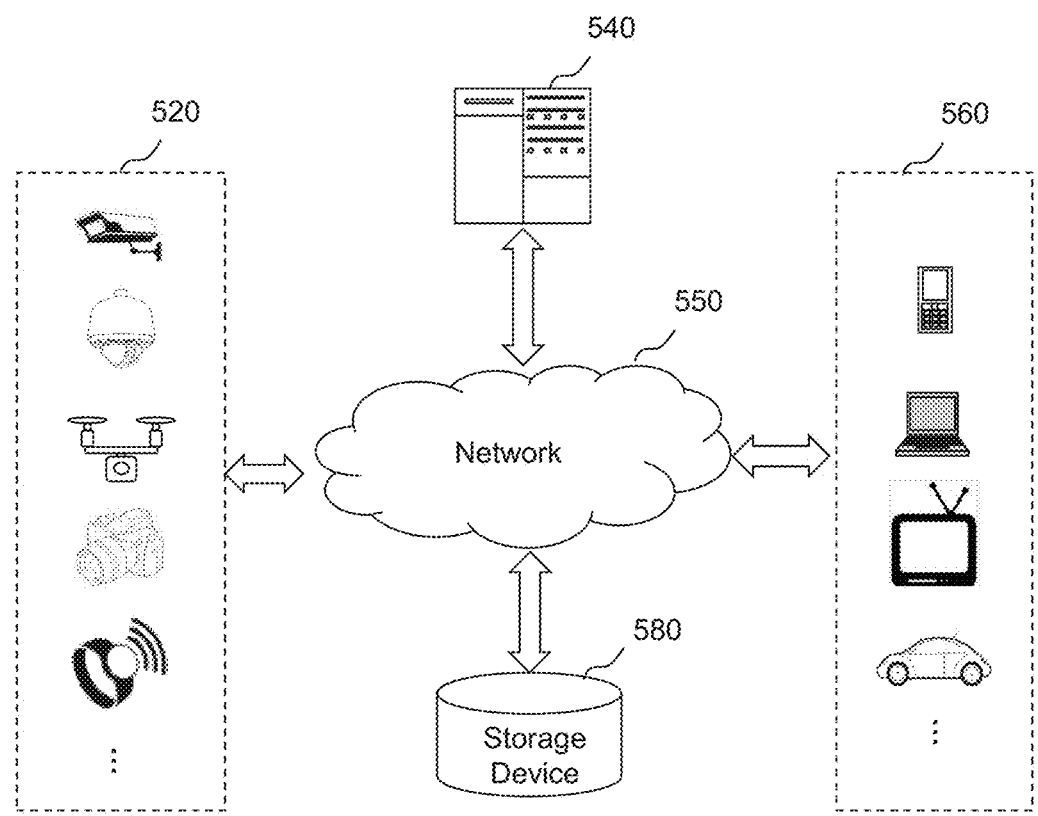
FIG. 5 is a schematic diagram illustrating an exemplary driving assistance system according to some embodiments of the present disclosure.

FIG. 5 is a schematic diagram illustrating an exemplary driving assistance system 500 according to some embodiments of the present disclosure. As shown, the driving assistance system 500 may include a monitoring device 520, a processing engine 540, a storage device 580, one or more terminal(s) 560, and a network 550. In some embodiments, the monitoring device 520, the processing engine 540, the storage device 580, and/or the terminal(s) 560 may be connected to and/or communicate with each other via a wireless connection (e.g., the network 550), a wired connection, or a combination thereof. The connection between the components in the driving assistance system 500 may be variable. Merely by way of example, the monitoring device 520 may be connected to the processing engine 540 through the network 550, as illustrated in FIG. 5. As another example, the monitoring device 520 may be connected to the processing engine 540 directly. As a further example, the storage device 580 may be connected to the processing engine 540 through the network 550, as illustrated in FIG. 5, or connected to the processing engine 540 directly. As still a further example, the terminal(s) 560 may be connected to the processing engine 540 through the network 550, as illustrated in FIG. 5, or connected to the processing engine 540 directly.

The monitoring device 520 may be positioned to perform surveillance of an area of interest (AOI) or an object of interest. In some embodiments, the AOI may be indoor or outdoor. For example, the AOI may include a room, a shopping mall, a street, a park, a subway station, etc. The object may be organism or non-organism. For example, the object may include a person, a vehicle, an animal, a physical subject, or the like, or a combination thereof. In some embodiments, the monitoring device 520 may be installed inside a vehicle to obtain information about the surrounding environment, such as road conditions.

In some embodiments, the monitoring device 520 may be and/or include any suitable device that is capable of acquiring real-time image data. In some embodiments, the monitoring device 520 may include a video camera, a wearable smart device, or the like, or a combination thereof. As used herein, a video camera may refer to an apparatus for visual recording. For example, the video camera may include a color camera, a digital video camera, a camera, a camcorder, a PC camera, a webcam, an infrared(IR) video camera, a low-light video camera, a thermal video camera, a CCTV camera, a pan-tilt-zoom (PTZ) camera, a video sensing device, or the like, or a combination thereof. The monitoring device 520 may include one or more video cameras that are installed in various places to monitor an area of interest. For example, the monitoring device 520 may be an in-vehicle camera. The wearable smart device wearable devices include a pair of glasses, a shoulder strap, a smart watch, an anklet, a thigh band, an armband, a chest belt, a necklet, a finger clip, or the like, or a combination thereof. The above mentioned examples of monitoring device 520 are provided for illustration purposes, and not intended to limit the scope of the present disclosure.

The processing engine 540 may process data and/or information obtained from the monitoring device 520, the storage device 580, and/or the terminal(s) 560. For example, the processing engine 540 may detect and classify objects in the real-time image data acquired from the monitoring device 520. As another example, the processing engine 540 may calibrate the monitoring device 520 based on detected objects reflected in the real-time image data collected by the monitoring device 520. In some embodiments, the processing engine 740 may be a single server or a server group. The server group may be centralized or distributed. In some embodiments, the processing engine 540 may be local or remote. For example, the processing engine 540 may access information and/or data from the monitoring device 520, the storage device 580, and/or the terminal(s) 560 via the network 550. As another example, the processing engine 540 may be directly connected to the monitoring device 520, the terminal(s) 560, and/or the storage device 580 to access information and/or data. In some embodiments, the processing engine 540 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 540 may be implemented by a computing device 600 having one or more components as described in connection with FIG. 6.

The storage device 580 may store data, instructions, and/or any other information. In some embodiments, the storage device 580 may store data obtained from the processing engine 540, and the terminal(s) 560. For example, the storage device 580 may store real-time image data relating to at least one scene acquired by the monitoring device 520. As another example, the storage device 580 may store parameters of a camera determined by the processing engine 540. As still another example, the storage device 580 may store one or more estimated values corresponding to one or more features relating to subjects detected in real-time image data. As still another example, the storage device 580 may store one or more reference values corresponding to one or more features relating to subjects. In some embodiments, the storage device 580 may store data and/or instructions that the processing engine 540 may execute or use to perform exemplary methods described in the present disclosure. For example, the storage device 580 may store instructions that the processing engine 540 may execute or use to determine real-time target parameters of a camera. In some embodiments, the storage device 580 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 580 may be implemented on a cloud platform as described elsewhere in the disclosure.

In some embodiments, the storage device 580 may be connected to the network 550 to communicate with one or more other components in the driving assistance system 500 (e.g., the processing engine 540, the terminal(s) 560, etc.). One or more components in the driving assistance system 500 may access the data or instructions stored in the storage device 580 via the network 550. In some embodiments, the storage device 580 may be part of the processing engine 540.

The terminal(s) 560 may be connected to and/or communicate with the monitoring device 520, the processing engine 540, and/or the storage device 580. For example, the terminal(s) 560 may obtain real-time image data acquired by the monitoring device 520 and transmit the real-time image data to the processing engine 540 to be processed. As another example, the terminal(s) 560 may obtain a processed image from the processing engine 540. As still another example, the terminal(s) 560 may obtain parameters of a camera determined by the processing engine 540. In some embodiments, the terminal(s) 560 may include a mobile device, a tablet computer, a laptop computer, or the like, or any combination thereof. For example, the mobile device may include a mobile phone, a personal digital assistance (PDA), a gaming device, a navigation device, a point of sale (POS) device, a laptop, a tablet computer, a desktop, or the like, or any combination thereof. In some embodiments, the terminal(s) 560 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 540 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 560 may be part of the processing engine 540. In some embodiments, the driving assistance system 500 may be implemented on the terminal(s) 560. In some embodiments, the terminal(s) 560 may establish a communication (e.g., wireless communication) with the processing engine 540, through an application (e.g., the application 790 in FIG. 7) installed in the terminal(s) 560. The application may be associated with the driving assistance system 500. For example, the application may be a vehicle navigation application associated with the driving assistance system 500. In some embodiments, the application installed in the terminal(s) 560 may direct the terminal(s) 560 to obtain, continuously or periodically, real-time image data from a camera of the terminal(s) 560 and automatically calibrate the camera of the terminal(s) 560.

The network 550 may include any suitable network that can facilitate exchange of information and/or data for the driving assistance system 500. In some embodiments, one or more components of the driving assistance system 500 (e.g., the monitoring device 520, the processing engine 540, the storage device 580, the terminal(s) 560, etc.) may communicate information and/or data with one or more other components of the driving assistance system 500 via the network 550. For example, the processing engine 540 may obtain real-time image data from the monitoring device 520 via the network 550. As another example, the processing engine 540 may obtain user instruction(s) from the terminal(s) 560 via the network 550. The network 550 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 550 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 550 may include one or more network access points. For example, the network 550 may include wired and/or wireless network access points such as base stations and/or internet exchange points through which one or more components of the driving assistance system 500 may be connected to the network 550 to exchange data and/or information.

It should be noted that the driving assistance system 500 is merely provided for the purposes of illustration, and is not intended to limit the scope of the present disclosure. For persons having ordinary skills in the art, multiple variations or modifications may be made under the teachings of the present disclosure. For example, the driving assistance system 500 may further include a database, an information source, or the like. As another example, the driving assistance system 500 may be implemented on other devices to realize similar or different functions. However, those variations and modifications do not depart from the scope of the present disclosure.

FIG. 6 is a schematic diagram illustrating exemplary hardware and/or software components of an exemplary computing device 600 on which the processing engine 540 may be implemented according to some embodiments of the present disclosure. As illustrated in FIG. 6, the computing device 600 may include a processor 610, a storage 620, an input/output (I/O) 630, and a communication port 640.

The processor 610 may execute computer instructions (e.g., program code) and perform functions of the processing engine 540 in accordance with techniques described herein. The computer instructions may include, for example, routines, programs, objects, components, data structures, procedures, modules, and functions, which perform particular functions described herein. For example, the processor 610 may process real-time image data obtained from the monitoring device 520, the storage device 580, terminal(s) 560, and/or any other component of the driving assistance system 500. In some embodiments, the processor 610 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 600. However, it should be noted that the computing device 600 in the present disclosure may also include multiple processors, thus operations and/or method steps that are performed by one processor as described in the present disclosure may also be jointly or separately performed by the multiple processors. For example, if in the present disclosure the processor of the computing device 600 executes both operation A and operation B, it should be understood that operation A and operation B may also be performed by two or more different processors jointly or separately in the computing device 600 (e.g., a first processor executes operation A and a second processor executes operation B, or the first and second processors jointly execute operations A and B).

The storage 620 may store data/information obtained from the monitoring device 520, the storage device 580, the terminal(s) 560, and/or any other components of the driving assistance system 500. In some embodiments, the storage 620 may include a mass storage, a removable storage, a volatile read-and-write memory, a read-only memory (ROM), or the like, or a combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 620 may store one or more programs and/or instructions to perform exemplary methods described in the present disclosure. For example, the storage 620 may store a program for the processing engine 540 for determining real-time target parameters of a camera.

The I/O 630 may input and/or output signals, data, information, etc. In some embodiments, the I/O 630 may enable a user interaction with the processing engine 540. In some embodiments, the I/O 630 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 640 may be connected to a network (e.g., the network 550) to facilitate data communications. The communication port 640 may establish connections between the processing engine 540 and the monitoring device 520, the storage device 580, and/or the terminal(s) 560. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 640 may be and/or include a standardized communication port, such as RS232, RS485, etc. In some embodiments, the communication port 640 may be a specially designed communication port. For example, the communication port 640 may be designed in accordance with the digital imaging and communications in medicine (DICOM) protocol.

FIG. 7 is a schematic diagram illustrating exemplary hardware and/or software components of an exemplary mobile device 700 on which the terminal(s) 560 may be implemented according to some embodiments of the present disclosure. As illustrated in FIG. 7, the mobile device 700 may include a communication platform 710, a display 720, a graphic processing unit (GPU) 730, a central processing unit (CPU) 740, an I/O 750, a memory 760, and a storage 770. In some embodiments, any other suitable component, including but not limited to a system bus or a controller (not shown), may also be included in the mobile device 700. In some embodiments, a mobile operating system 780 (e.g., iOS™, Android™, Windows Phone™, etc.) and one or more applications 790 may be loaded into the memory 760 from the storage 790 in order to be executed by the CPU 740. The applications 780 may include a browser or any other suitable mobile apps for receiving and rendering information relating to image processing or other information from the processing engine 540. User interactions with the information stream may be achieved via the I/O 750 and provided to the processing engine 540 and/or other components of the driving assistance system 500 via the network 550.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system, comprising:
   a computer-readable storage medium storing executable instructions for calibrating a camera; and
   at least one processor in communication with the computer-readable storage medium, when executing the executable instructions, the at least one processor is directed to:
   obtain real-time image data relating to at least one scene acquired by the camera at a present moment;
   identify a plurality of real-time first features relating to a plurality of subjects from the real-time image data;
   determine one or more first estimated values corresponding to the plurality of real-time first features, the one or more first estimated values being represented by a first coordinate system;
   obtain one or more first reference values corresponding to the plurality of real-time first features, the one or more first reference values being represented by a second coordinate system, each of the one or more first estimated values corresponding to one of the one or more first reference values;
   obtain one or more pre-determined parameters of the camera;
   determine one or more second reference values corresponding to the plurality of real-time first features of the plurality of subjects based on the one or more pre-determined parameters of the camera and the one or more first estimated values, the one or more second reference values being represented by the second coordinate system, and the second coordinate system being a real world coordinate system;
   determine whether a number of differences between the one or more first reference values and the corresponding one or more second reference values exceeds a threshold;
   determine that the camera needs to be calibrated in response to a determination that the number of differences between the one or more first reference values and the corresponding one or more second reference values exceeds the threshold;
   determine one or more real-time target parameters of the camera at the present moment based on the one or more first estimated values and the one or more first reference values in response to a determination that the camera needs to be calibrated; and
   designate the one or more pre-determined parameters of the camera as the one or more real-time target parameters of the camera in response to a determination that the camera does not need to be calibrated.

2. The system of claim 1, wherein to determine the one or more real-time target parameters of the camera based on the one or more first estimated values and the one or more first reference values, the at least one processor is further directed to:
   determine at least one set of real-time second features from the plurality of real-time first features;
   determine at least one set of one or more first parameters of the camera based on the at least one set of the real-time second features;
   determine the one or more second reference values corresponding to the plurality of real-time first features of the plurality of subjects based on each of the at least one set of the one or more first parameters; and
   determine the one or more real-time target parameters of the camera based on differences between the one or more first reference values and the one or more second reference values.

3. The system of claim 1, wherein to determine the one or more real-time target parameters of the camera based on the one or more first estimated values and the one or more first reference values, the at least one processor is further directed to:
   determine the one or more real-time target parameters of the camera based on the one or more first estimated values, the one or more first reference values, and the one or more pre-determined parameters of the camera according to a gradient algorithm.

4. The system of claim 1, wherein to determine the one or more real-time target parameters of the camera based on the one or more first estimated values and the one or more first reference values, the at least one processor is further directed to:
   determine the one or more real-time target parameters of the camera based on the one or more first estimated values and the one or more first reference values according to a recurrence algorithm or a numerical algorithm.

5. The system of claim 1, wherein the plurality of subjects includes at least one of at least one portion of a lane mark, at least one portion of a vehicle, at least one portion of a facility, or at least one portion of a human.

6. The system of claim 1, wherein the camera is installed in a mobile device.

7. The system of claim 1, wherein to identify a plurality of features relating to a plurality of subjects from the real-time image data, the at least one processor is further directed to: detect the plurality of subjects from the real-time image data; classify the plurality of subjects; and identify the plurality of features relating to the plurality of subjects based on the plurality of classified subjects.

8. A method implemented on a computing device having at least one processor and at least one computer-readable storage medium, the method comprising:
   obtaining real-time image data relating to at least one scene acquired by a camera;
   identifying a plurality of real-time first features relating to a plurality of subjects from the real-time image data;
   determining one or more first estimated values corresponding to the plurality of real-time first features, the one or more first estimated values being represented by a first coordinate system;

obtaining one or more first reference values corresponding to the plurality of real-time first features, the one or more first reference values being represented by a second coordinate system, each of the one or more first estimated values corresponding to one of the one or more first reference values;

obtaining one or more pre-determined parameters of the camera;

determining one or more second reference values corresponding to the plurality of real-time first features of the plurality of subjects based on the one or more pre-determined parameters of the camera and the one or more first estimated values, the one or more second reference values being represented by the second coordinate system, and the second coordinate system being a real world coordinate system;

determining whether a number of differences between the one or more first reference values and the corresponding one or more second reference values exceeds a threshold; determining that the camera needs to be calibrated in response to a determination that the number of differences between the one or more first reference values and the corresponding one or more second reference values exceeds the threshold;

determining one or more real-time target parameters of the camera based on the one or more first estimated values and the one or more first reference values in response to a determination that the camera needs to be calibrated; and designating the one or more pre-determined parameters of the camera as the one or more real-time target parameters of the camera in response to a determination that the camera does not need to be calibrated.

9. The method of claim 8, wherein the determining the one or more real-time target parameters of the camera based on the one or more first estimated values and the one or more first reference values includes:

determining at least one set of real-time second features from the plurality of real-time first features;

determining at least one set of one or more first parameters of the camera based on the at least one set of the real-time second features;

determining the one or more second reference values corresponding to the plurality of real-time first features of the plurality of subjects based on each of the at least one set of the one or more first parameters; and determining the one or more real-time target parameters of the camera based on differences between the one or more first reference values and the one or more second reference values.

10. The method of claim 8, wherein the determining the one or more real-time target parameters of the camera based on the one or more first estimated values and the one or more first reference values includes:

determining the one or more real-time target parameters of the camera based on the one or more first estimated values, the one or more first reference values, and the one or more pre-determined parameters of the camera according to a gradient algorithm.

11. The method of claim 8, wherein the determining the one or more real-time target parameters of the camera based on the one or more first estimated values and the one or more first reference values includes:

determining the one or more real-time target parameters of the camera based on the one or more first estimated values and the one or more first reference values according to a recurrence algorithm or a numerical algorithm.

12. A non-transitory computer readable medium, comprising:

instructions being executed by at least one processor, causing the at least one processor to implement a method, comprising:

obtaining real-time image data relating to at least one scene acquired by a camera;

identifying a plurality of real-time first features relating to a plurality of subjects from the real-time image data;

determining one or more first estimated values corresponding to the plurality of real-time first features, the one or more first estimated values being represented by a first coordinate system;

obtaining one or more first reference values corresponding to the plurality of real-time first features, the one or more first reference values being represented by a second coordinate system, each of the one or more first estimated values corresponding to one of the one or more first reference values;

obtaining one or more pre-determined parameters of the camera;

determining one or more second reference values corresponding to the plurality of real-time first features of the plurality of subjects based on the one or more pre-determined parameters of the camera and the one or more first estimated values, the one or more second reference values being represented by the second coordinate system, and the second coordinate system being a real world coordinate system;

determining whether a number of differences between the one or more first reference values and the corresponding one or more second reference values exceeds a threshold;

determining that the camera needs to be calibrated in response to a determination that the number of differences between the one or more first reference values and the corresponding one or more second reference values exceeds the threshold;

determining one or more real-time target parameters of the camera based on the one or more first estimated values and the one or more first reference values in response to a determination that the camera needs to be calibrated; and designating the one or more pre-determined parameters of the camera as the one or more real-time target parameters of the camera in response to a determination that the camera does not need to be calibrated.

13. The system of claim 7, wherein to classify the plurality of subjects, the at least one processor is further directed to:

classify the plurality of subjects into a plurality of categories, the plurality of categories including human, animal, facility, vehicle, landmark, and lane line.

14. The method of claim 8, wherein the identifying a plurality of features relating to a plurality of subjects from the real-time image data includes:

detecting the plurality of subjects from the real-time image data;

classifying the plurality of subjects into a plurality of categories, the plurality of categories including human, animal, facility, vehicle, landmark, and lane line; and identifying the plurality of features relating to the plurality of subjects based on the plurality of classified subjects.

* * * * *